United States Patent [19]

Timm et al.

[11] Patent Number: 5,358,993
[45] Date of Patent: Oct. 25, 1994

[54] INLAID GRANITE PLASTIC FLOOR TILE

[75] Inventors: Walter C. Timm, Cornwall; Michael H. McNally, New Windsor, both of N.Y.

[73] Assignee: Tarkett AB, Ronneby, Sweden

[21] Appl. No.: 981,225

[22] Filed: Nov. 25, 1992

Related U.S. Application Data

[63] Continuation-in-part of Ser. No. 819,135, Jan. 10, 1992, abandoned, which is a continuation-in-part of Ser. No. 589,595, Sep. 28, 1990, abandoned, which is a continuation-in-part of Ser. No. 413,208, Sep. 27, 1989, Pat. No. 4,965,299.

[51] Int. Cl.$^5$ .................................................. C08K 3/34
[52] U.S. Cl. ................................. 524/445; 523/205; 523/437; 524/508; 524/509; 524/513
[58] Field of Search ............... 523/437, 205; 524/508, 524/509, 513, 445

[56] References Cited

U.S. PATENT DOCUMENTS

| | | | |
|---|---|---|---|
| 3,787,280 | 1/1974 | Conger et al. | 525/82 |
| 3,966,857 | 6/1976 | Charlton et al. | 264/75 |
| 4,348,447 | 9/1982 | Miller, Jr. et al. | 428/149 |
| 4,405,657 | 9/1983 | Miller, Jr. et al. | 427/520 |
| 4,440,826 | 4/1984 | Witman | 428/327 |
| 4,501,783 | 2/1985 | Hiragami et al. | 428/147 |
| 4,574,065 | 3/1986 | Appleyard et al. | 264/76 |

*Primary Examiner*—Paul R. Michl
*Assistant Examiner*—john J. Guarriello
*Attorney, Agent, or Firm*—Nies, Kurz, Bergert & Tamburro

[57] ABSTRACT

An inlaid tile composition and a method for making the composition in which filled colored polymeric chips are uniformly dispersed throughout a filled thermoplastic tile base is disclosed. In an alternative embodiment, colored, coated mineral chips of a mineral such as quartz are uniformly dispersed throughout a filled thermoplastic tile base. The chips are coated by a ceramic technique or with a pigmented polyester or epoxy resin. Alternatively, a mixture of coated mineral chips and partially cross linked resinous chips may be employed. In a further embodiment, additional chips may be spread on the top surface of the formed sheet and pressed in with a roller, prior to the final calendering step. The tile base may contain a lubricant to reduce processing temperatures and shear forces in the intensive mixer.

49 Claims, 3 Drawing Sheets

INLAID GRANITE PLASTIC FLOOR TILE

BACKGROUND AND SUMMARY OF THE INVENTION

This is a continuation-in-part of application Ser. No. 819,135 filed Jan. 10, 1992, abandoned, which is a continuation-in-part of application Ser. No. 589,595 filed Sep. 28, 1990, abandoned, which is a continuation-in-part of application Ser. No. 413,208 filed Sep. 27, 1989, now U.S. Pat. No. 4,965,299.

In one embodiment, the present invention relates to an inlaid tile in which filled colored polymeric chips are uniformly dispersed throughout a filled thermoplastic mass which may be of a different color. The chips remain discrete during high temperature processing in an intensive mixer such as a Banbury mixer or mixing mill. By the invention, an inlaid tile is produced with decorative plastic chips which are dispersed throughout a thermoplastic base so that the chips remain discrete and non-smearing and do not elongate during processing.

Previous compositions having chips contained within a base material are described, for example, in the following U.S. Pat. Nos: 3,787,280 to Conger et al.; 3,966,857 to Charlton et al; 4,054,699 to Brinkley; and 4,501,783 Hiragami et al.

By the present invention, there is provided an improved inlaid floor tile in which colored chips are formulated with polymers, stabilizers, fillers, cross linking agents and pigments which differ from the thermoplastic base. The tile base is produced with polymers, stabilizers, fillers, processing aids, pigments and internal lubricants of fillers coated with lubricants. The lubricants are used in the thermoplastic base to reduce processing temperatures and shear in the intensive mixer so that the decorative chips remain discrete particles and do not flow during processing.

In another embodiment, the chips which are added to the tile base formulation are colored, coated mineral chips of a mineral such as quartz, glass or feldspar with the coating being made of pigmented polyester or epoxy or by a ceramic technique. Alternatively, a mixture of coated mineral chips and partially cross linked resinous chips may be employed. By the addition of such chips, there is produced a tile product having a granite appearance or effect.

DESCRIPTION OF THE PREFERRED EMBODIMENTS

Figure 1:
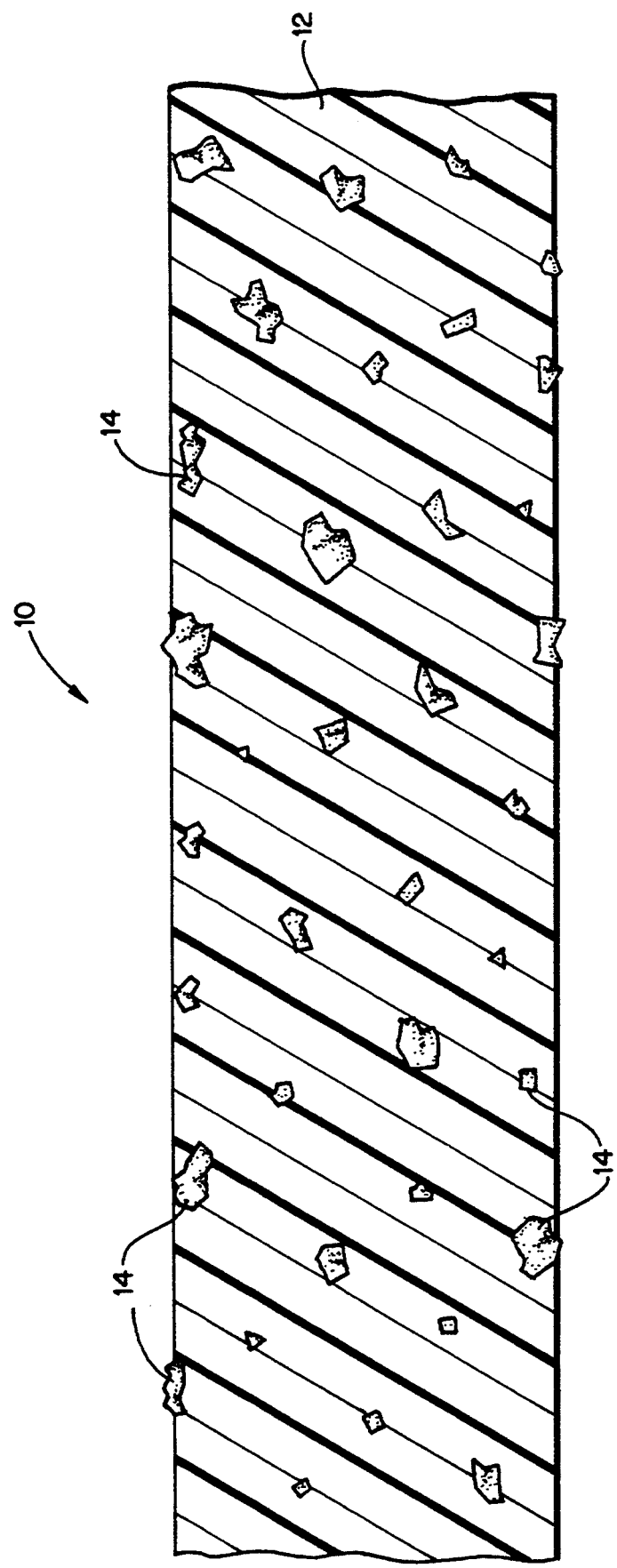
FIG. 1 is a vertical cross-sectional view of a portion of the tile composition of the present invention, containing the tile base with particulate materials dispersed therein.

In the embodiment of the invention as shown in FIG. 1, there is provided a tile product 10 having a tile base 12 with particles or chips 14 uniformly dispersed throughout the base 12 as shown.

In accordance with the present invention, techniques which may be employed to produce the polymeric phase of the chip formulation include:
1. Cross linking
2. Combination of partially cross linking and high melting thermoplastics in which each chip is formulated with partial cross-linking and the remainder of the chip polymeric phase is high melting thermoplastic.

As an example of chip production, the chips may be produced by mixing the ingredients in an intensive mixer, such as a steam-jacketed Banbury mixer operating at 40 to 46 rpm with steam at 310° F. Mixing continues until the combination of the heat provided by the steam and the shear action of the mixer produces a temperature in the material being mixed of about 350° F., and under such conditions the ingredients become a molten mass. The mass is then calendered to produce a sheet approximately 100 mils thick. The sheet is heated to 400° F. by use of radiant heat or other means to partially cross link the polymeric ingredients, after which the sheet is cooled and ground into small chips with the dust −200 mesh being screened out. In an alternative embodiment the calendered sheet may first be ground into chips and then fed into a fluidized bed to effect cross linking of the polymeric components.

The size of the chips employed in the invention include particles in which the major portion, about 94 to 100 wt. percent, has a U.S. mesh size of between 10 and 200 mesh, and including an additional portion of 0 to 1 wt. percent of a size which is retained on a 10 U.S. mesh screen and a portion of 0 to 5 wt. percent which passes through a 200 U.S. mesh screen. In a preferred embodiment the chips have a Shore D hardness range of 75 to 88. In the embodiment as shown in FIG. 1, the chips produced by the present invention preferably are not round but angular and non-uniform in shape, having sharp edges and with the chip size of the major portion being uniformly distributed throughout a U.S. mesh size of 10 to 200 mesh, preferably 14 to 40 mesh.

In one embodiment of a chip composition, the mesh size specification was as follows:

| U.S. Mesh Size | % by wt |
| --- | --- |
| +14 | 0 |
| −14 to +16 | 2% max |
| −14 to +18 | 22 to 32% |
| −14 to +25 | 70 to 90% |
| −40 | 2% max |

An example of a chip formula is as follows:

| Chip Formula | % by wt |
| --- | --- |
| 1. Polyvinyl Chloride Homopolymer | 35.0 |
| 2. Phenolic Resin | 7.0 |
| 3. Pentaerythritol | 1.0 |
| 4. Magnesium oxide | 1.0 |
| 5. −40 Mesh Limestone (420 Microns) | 55.9 |
| 6. Red Pigment (oxide) | 0.1 |
| Total | 100.0 |

With regard to the chip formula, ingredient No. 1 is the main thermoplastic synthetic polymer component of the chips and is present in an amount of about 25 to 80 weight percent of the chip composition, depending on the filler level of the chips. In addition to the above stated example, the thermoplastic polymer component may alternatively be one or more of the following: (a) a copolymer of polyvinyl chloride with polyvinyl acetate; (b) polyester resin; or (c) chlorinated polyethylene, and need not necessarily have a softening temperature higher than the polymers used in the tile base since it will be partially cross-linked during chip manufacture.

Ingredient No. 2 functions as a plasticizer which will liquify initially for the initial phase in the Banbury mixer but is then irreversibly cross linked with ingredients 3 and 4 at 400° F. and will not liquify again. The plasticizer may also be polyester or epoxy resin or a combination of said resins. The plasticizer may be present in an amount of about 0 to 10 weight percent of the chip composition. In a preferred embodiment, the amount of plasticizer is about 5 to 9 weight percent of the chip composition.

During chip production, the polyvinyl chloride or other thermoplastic polymer component cross links or partially cross links with magnesium oxide and pentaerythritol. The phenolic resin also cross links with magnesium oxide and pentaerythritol.

Any of various colored pigments may be employed in the chip composition. A high melting thermoplastic in the form of an acrylic resin such as polymethyl methacrylate polymer may be employed in combination with the phenolic resin to enhance the flowability. Such a high melting thermoplastic will soften or flow during chip production but will not soften or flow during the second phase of tile production in which the chips are mixed with the tile base material. In another embodiment, an epoxy resin is employed instead of the phenolic resin and melamine is added to cross link the epoxy.

In the production of the chips by a combination of partially cross linking and high melting thermoplastics, approximately 9 to 40 weight percent of the total chip formulation is cross linked. Thus approximately at least 18 weight percent of the chip polymeric phase is cross linked. The amount of cross linking is controlled by the temperature and time employed during chip production as well as by the amount of cross linking agent employed.

The high melting thermoplastics include those materials which do not soften or flow at the temperatures employed during mixing of the chips with the tile base material in the intensive mixer. The high melting thermoplastic materials may include, for example, a combination of acrylic resin and PVC. The high melting thermoplastic component can be present in an amount of about 5 to 50 weight percent of the total chip composition.

In the event that cross linked chips are employed without high melting thermoplastics, it is not necessary to employ lubricant in the base material, provided the chip material is irreversibly cross linked.

By the use of partial cross linking in chip production along with high-melting thermoplastics, processing time required to cross link can be reduced from one-half hour or more down to a time of about 15 seconds. Such a feature is highly advantageous in reducing the amount of line time so that the process can be carried out in an efficient and economical manner.

The −40 mesh limestone functions as a filler in the chid formula. Other suitable filler materials such as alumina trihydrate may be employed. The chip composition contains about 10 to 75 weight percent filler.

The amount of chips employed in the tile base generally about 2 to 20 weight percent of the total formulation of chips and base.

As an example of production of the tile composition of the present invention, the tile base may first be produced by adding the ingredients to an intensive mixer such as a steamjacketed Banbury mixer having steam at 310° F. and operating at 40 to 46 rpm, with mixing for a period of about 2 minutes until the ingredients become a molten thermoplastic mass, at which time the cross linked chips previously produced can be added. After an additional mixing period of about 20 seconds to 1 minute, the molten mass at a temperature of about 300° F. is dropped to a two roll heated mill where a sheet is formed. The sheet is calendered to thickness, then cooled and cut into tiles of the desired size such as 12"×12". The sheet can also be embossed. The thickness of the final tile product is generally about 0.0625 to 0.231 inch.

An example of a tile base formula is as follows:

| Tile Base Formula | % by wt |
|---|---|
| 1. Resin mixture 40% PVC homopolymer and 60% PVC, PVA Copolymer | 13.0 |
| 2. Ground Limestone −40 Mesh and finer | 59.8 |
| 3. Plasticizer DINP | 4.0 |
| 4. Zinc Stearate (Lub) | .02 |
| 5. Stabilizer Synpron 1751 Calcium Zinc Type | .88 |
| 6. Hi-Plex 100 Pfizer Surface treated CaCO3 with Calcium Stearate | 10.0 |
| 7. Processing aid alpha methyl styrene | 1.5 |
| 8. Talc 7 Micron | 10.0 |
| 9. Pigment (TiO2) | 0.8 |
| Total | 100.00 |

With regard to the title base formula, ingredients No. 1 is the main thermoplastic synthetic polymer component of the tile base and is present in an amount of about 10 to 25 weight percent of the tile base. The thermoplastic base component may be produced from any suitable filled polymer, such as that formed of a vinyl polymer, including a homopolymer, a copolymer or a combination of the two. Thus the thermoplastic polymer component may, for example, be a combination of from about 40 to 100 weight percent, preferably about 40 to 80 weight percent, of PVC homopolymer and from about 0 to 60 weight percent, preferably from about 20 to 60 weight percent, of a copolymer of PVA and PVC. The thermoplastic polymer component may also be formed of polypropylene or polybutylene materialsmaterials.

Ingredient No. 2 functions as a filler in the tile base. Other suitable filler materials may be employed. The amount of filler in the tile base can be about 50 to 85 weight percent.

Ingredient No. 3 functions as a plasticizer and may be present in an amount of about 3 to 6 weight percent of the tile base.

With regard to the lubricant component, it is possible to obtain the desired lubricating property by the use of any one of ingredients Nos. 4, 5 or 6. In this regard, ingredient No. 6 may be employed in amounts of up to 20 percent and this surface treated limestone includes a small amount of lubricant which acts to control the drop temperature and shear forces. By the use of a lubricant component in the tile base, the drop temperature may be maintained at 300° F. or less so that the chips when added will not soften or melt and also the abrasion of the pigmented mineral coated chips will be reduced. In this regard, the amount of lubricant employed is generally in an amount of about 0.10 to 1.0 percent by weight of the tile base. Satisfactory lubricants include calcium stearate, zinc stearate, and stearic acid, as well as various oleates and palmitates known in the art.

With regard to that portion of the process in which the molten mass is dropped to the two roll mill, a short time interval such as about 20 seconds after addition of the chips is desirable before the material is dropped, in order to maintain definition of the chips. At least about 20 seconds in the high intensity mixer is needed to obtain proper chip dispersal in the base material. Thus a time interval of about 20 seconds to 3 minutes (the entire Banbury mixing time), preferably from about 20 seconds to 1 minute, is usually employed. The chips may be subject to bleeding or breaking if mixed for longer periods of time. Also shear forces develop upon addition of the chips which could cause the temperature to rise above 300° F., thus softening the chips.

The use of reaction temperatures in the range of about 300° to 400° F. is particularly desirable when PVC is employed, in order to maintain the stability of the PVC component. At temperatures above 400° F., the PVC degrades and there is not sufficient time for proper utilization of the PVC. At temperatures below about 280° F., on the other hand, PVC will not process or fuse properly.

In one embodiment of the invention, the chips and the tile base had a formulation hardness as follows, based upon a 77° F. indentation test in accordance with Federal Test Method Standard No. 501:

Chips - 4 to 6 mils at Gauge 90 to 100 mils
Base - 9 to 11 mils at Gauge 125 mils In another embodiment of the present invention, the tile composition is produced by a method in which from about 2 to 20 weight percent of the total initial composition of the partially cross linked chips as described previously are added to the previously described tile base formulation on a two roll blending mill and a mottled mill pad is formed. The mill pad is then calendered to a thickness of 60 to 120 mils and ground into chips between 14 to 40 mesh. The ground chips are reformed into a sheet by one of the following methods:

1. By consolidating the reheated chips, at a temperature of about 190° to 240° F., between the rolls of a sheeter mill.

2. By pressing the chips into a thermoplastic base sheet between the rolls of a calender. The chips are normally at a temperature between 210° to 300° F. The thermoplastic base sheet may be at a temperature such as about 300° F. The thermoplastic base sheet, which may have a composition such as that employed for the tile base formulation previously described, may also contain about 5 to 10 weight percent of the total composition of partially cross linked chips.

The tile smooth surface finish and final thickness are achieved by running the sheet through a series of calenders.

Then the sheet is cooled and cut into tile in a punch press.

In a further embodiment of the present invention, approximately 5 to 10 percent by weight of the total initial composition of partially cross linked chips as described previously are added to the previously described thermoplastic tile base formulation in an intensive mixer such as a Banbury mixer. The batch is mixed and dropped at 300° to 350° F. on a two roll mill where a mill pad is formed. The pad is calendered to gauge through a series of calenders, where an additional 1 to 10 weight percent of the total composition of partially cross linked chips as described previously are spread on the sheet surface between calenders. Here the chips of a size between 14 and 40 mesh are pressed into the surface. Since the chips are partially cross linked, a smooth surface without chip pattern elongation is achieved.

Important concepts which are employed in the present invention include:

1. Use of cross linked materials which are irreversibly cross linked so as to produce the desired chips which remain discrete non-smearing and do not elongate during processing. The cross linked product is insoluble in tetrahydrofuran (THF) indicating irreversible cross linking and the formulation can be also partially cross linked as indicated by partial or extremely slow solubility in THF, so as not to flow at intensive mixer temperature at which the chips are added to the thermoplastic base.

2. Use of either one or a combination of (a) partial cross linking and (b) high melting temperature thermoplastics to produce chips which do not flow at the temperatures required in the intensive mixer. The partially cross linked materials are those which will not flow at temperatures of up to 350° F. when PVC is employed.

3. The crosslinking of the plasticizer phase of the chip formulation after it has been used to aid in the initial processing of the PVC thermoplastic polymers.

4. The use of chips which are partially cross linked to the degree necessary to minimize chip elongation at the point where the chips are added to the process. When chips are added to the intensive mixer where shear forces are high and the temperature is about 300 degrees F, a high degree of cross linking is required to prevent smearing and elongation. Whereas, when the chips are added between the calender rolls, shear forces and temperatures are lower and as a result the degree of cross linking can be reduced. By reducing the cross linking, a small amount of flow without elongation can be achieved which improves tile surface smoothness.

5. Use of lubricants in the thermoplastic base to reduce the processing temperatures and shear in the intensive mixer such as a Banbury so that the partially cross linked and high melting temperature polymers decorative chips remain discrete particles and do not flow during processing. In this way, the mixing temperature is controlled so it is below the softening point of the chips. The drop temperature, when the molten batch is dropped onto the mill, is generally around 300° F. when PVC is employed.

6. Use of chips and thermoplastic base materials which are highly filled to provide a tile product which is dimensionally stable and can be easily cut on the punch presses employed to cut the tile. The chips will generally contain about 10 to 75 weight percent filler and the base material will contain about 50 to 85 weight percent filler.

Figure 5:
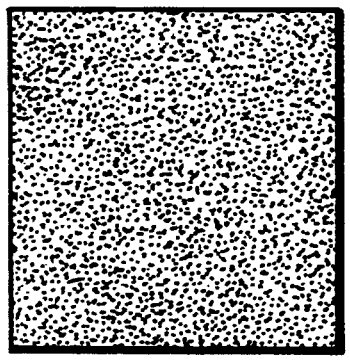
FIG. 5 is a top view showing the surface of the present tile product employing a relatively sparse amount of chip materials.
Figure 6:
FIG. 6 is a top view similar to FIG. 5 but showing the use of a relatively heavy amount of chip materials.

In another embodiment of the present invention, the same tile base formulation as previously described is employed but, rather than adding partially cross linked resinous chips, the chips are colored, coated mineral chips of a mineral such as quartz with the coating being made by a ceramic technique, or coated with a pigmented polyester or epoxy resin. In an alternative embodiment, a mixture of coated chips and the previously described partially cross linked resinous chips having the same particle size range as the coated chips is employed. By the addition of such chips to the tile base formulation as described herein, there is thus produced a tile product having a granite appearance or effect as shown in FIGS. 5 and 6.

When polyester or epoxy coated chips are employed, the coating resin used is a commercially available polyester or epoxy resin which encapsulates the mineral chips such as quartz, feldspar or glass which can be in the form of solid beads with a pigmented coating. The liquid polyester coatinq is fused to a solid state by the addition of peroxide hardeners. Clear or transparent mineral chips are chosen so the color shows through the chips from all surfaces and thus wear cannot be detected.

The polyester coating is a thermosetting synthetic resin produced by the esterification of polybasic acid or anhydride with polyhydric alcohols.

For example the unsaturation is achieved by the use of dibasic anhydride or fumaric acid. The unsaturated acid or anhydride is reacted with alcohols such as ethylene and propylene glycols to form the polyester.

In addition to the unsaturated dibasic acid, a saturated acid can also be used such as phthalic anhydride or adipic acid in the mixture. A higher proportion of unsaturated acid gives a more reactive resin system and improves high temperature stiffness of the coating which is useful in the high temperature mixing of base tile and coated mineral chips in the Banbury mixer.

More saturated acid lowers the reactivity of the reaction and reduces the heat of the exothermic cures and gives the polyester coating less stiffness at high temperatures.

A styrene monomer is used to thin the resin making it pourable and making it possible to coat the mineral chips.

The ingredients of the polyester resin are mixed in a resin kettle and are polymerized by a step reaction. The reaction results in a viscous liquid with a molecular weight range of 1000 to 2000. After cooling, the mixture is thinned with styrene to a pourable viscosity. An inhibitor such as hydroquinone is used to prevent premature polymerization.

| Typical Formulation* | | |
|---|---|---|
| Ingredient | PHR | Mole |
| Phthalic Anhydride | 28.86 | 0.2 |
| Maleic Anhydride | 19.11 | 0.2 |
| Propylene Glycol | 14.83 | 0.2 |
| Ethylene Glycol | 12.10 | 0.2 |
| Styrene | 30.00 | 0.3 |
| Hydroquinone | .02 | Trace |
| | 104.92** | |

*Source Chem. Eng. News 37, #51, 56 Dec. 21, 1959
**About 5 pounds of water is eliminated during esterification.

Pigment paste between one and ten percent by weight are added to give the resin coating the desired color. Cure is started by adding the initiator, organic peroxide, such as benzoyl peroxide. An accelerator such as a cobalt naphthenate can also be added to speed up the cure.

The mineral chips are coated with ½ to 5 mils of colored liquid polyester polymer in a mixer. After the coating hardens the colored mineral chips are ready for use in the base tile to produce the granite appearance. An example of a commercially available polyester coated quartz material employed in the invention is manufactured by Clifford W. Estes Co. of Lyndhurst, N.J.

Epoxy resin-containing pigments can also be used to coat clear or transparent mineral chips. A typical epoxy resin is made by condensing epichlorohydrin with bisphenol A. To leave epoxy groups on each end of the polymer an excess of epichlorohydrin is used. The reaction results in a viscous liquid polymer. The reaction is carried out in a NaOH solution. The epoxy resin is then cured with a polyamine. The pigments and a curing compound are added to the epoxy coating resin before encapsulation of the mineral chips.

The important factors to be considered when producing inlaid aggregate plastic floor tile with epoxy or polyester coated mineral chips are as follows:

1. The adhesion of pigmented polymeric coating to the mineral chips at the high shear and high temperatures encountered during mixing of the chips and the tile base formulation in the Banbury mixer.

2. The use of internal lubricants in the tile base formulation to minimize coating abrasion during the intensive Banbury mixing.

3. The use of clear or transparent mineral chips so the coating will show through the back of the chips and thus coating wear during service will not affect chip color.

When ceramic coated chips are employed, the ceramic coating is generally in the form of clay, pigments and water plus other materials which are fused into a ceramic glaze around the individual mineral particles by known methods. Different types of glazes may be employed to change the abrasive characteristics and color. The thickness of the ceramic coating is about 0.5 to 1.5 mils. The shape of the ceramic coated particles can be round or angular. The round chips give less equipment wear problems. Other minerals which may be employed for the chips, in addition to quartz and apatite, include feldspar, anorthite, also known as lime feldspar, and glass.

In carrying out the invention, the coated mineral chips, having a Mohs hardness of 5 to 8 and a particle size of 44 to 2,000 microns, are added to the tile formulation in an amount of from about 2 to 20% by weight of the total formulation. The mixture is combined in a mixer or a blending mill.

The mixed batch, from a mixer such as a Banbury mixer at a temperature of 300 to 350 degrees F., is dropped to a mill where it is formed into a pad about one inch thick. Alternatively, the coated chips may be added in the blending mill, rather than in the Banbury mixer, so as to minimize wear on the Banbury type mixers.

The mill pad is calendered to a gauge of 150 to 250 mils. After the calendering step, additional chips in the amount of about 1 to 10% by weight of the total formulation may be spread on the top surface of the sheet via a vibrating spreader and pressed in with a roller. These additional chips may be either colored coated mineral chips such as those first added or may be the previously described partially cross linked resinous chips of the same particle size range as described for the coated chips, or a combination of both types. The sheet is then calendered to a final ⅛ nch thickness during calendering.

The sheet is then cut into 12" ×12" ×⅛ tiles or other sizes.

The abrasive characteristics and clearness of the mineral chips are significant features of the invention. The abrasive characteristics can be influenced by selecting the coating so as to control the abrasiveness and the wearing ability of the final product and also to reduce wear problems caused by the action of hard particles on the processing equipment during manufacture of the product. Also translucent or clear mineral is preferably selected for the chips so the colored coating will be visible and show through the back as well as the surface of the chips and as a result as the chips wear the color will not change. Thus, for example, the particles can be made of a clear quartz material having a Mohs hardness of 8 and by using the pigmented polyester or ceramic coating over rounded quartz, the abrasive characteristics can be reduced.

Figure 2:
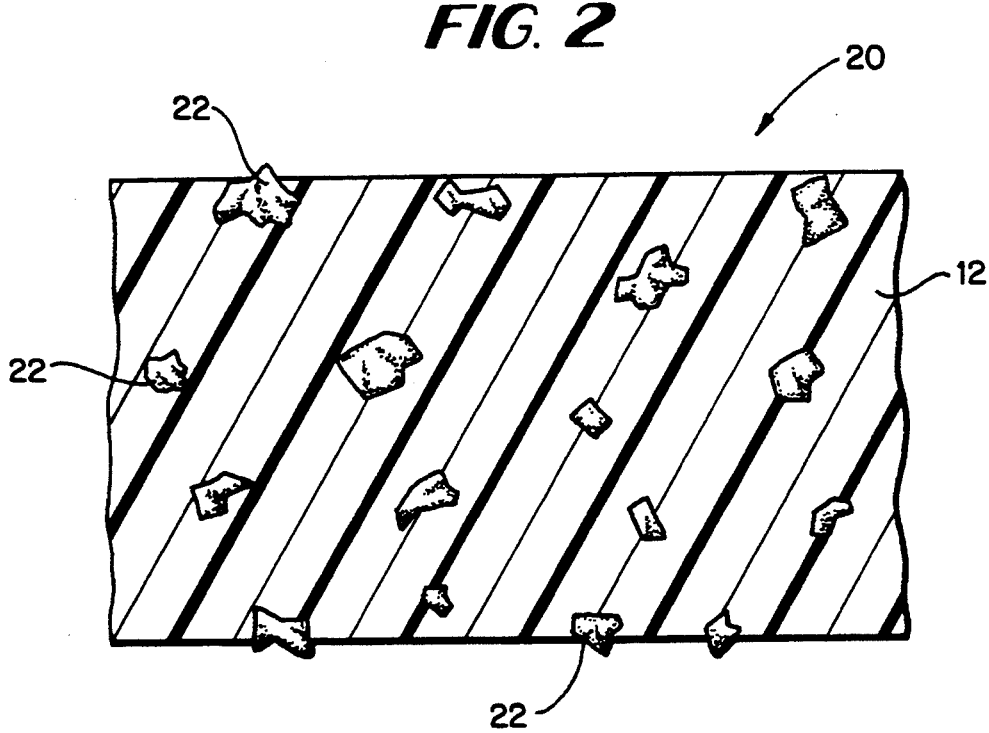
FIG. 2 is a vertical cross-sectional view of another embodiment of the tile product of the present invention, containing the tile base with angular coated mineral chips dispersed therein.

In the embodiment of the invention as shown in FIG. 2, there is provided a tile product 20 which includes a tile base 12 with angular coated mineral chips 22 uniformly dispersed throughout the base 12.

Figure 3:
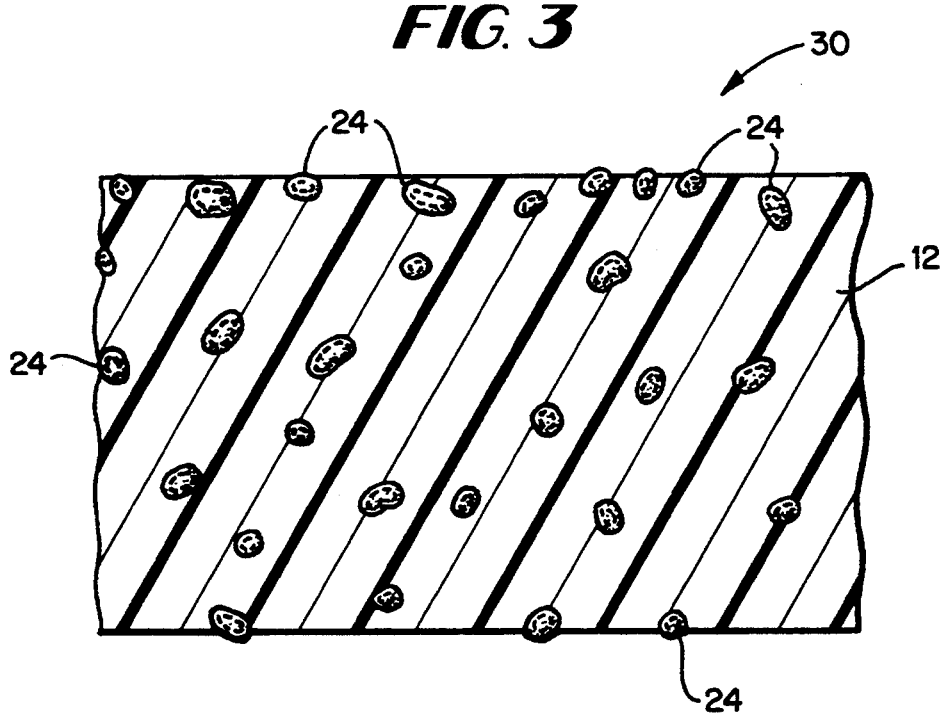
FIG. 3 is a vertical cross-sectional view similar to FIG. 2, containing the tile base with round coated mineral chips dispersed therein.

The embodiment of FIG. 3 shows a tile product 30 which includes a tile base 12 with round coated mineral chips 24 uniformly dispersed throughout the base 12 and with additional round coated mineral chips 24 having been spread on the top surface of the tile base 12 and pressed in.

Figure 4:
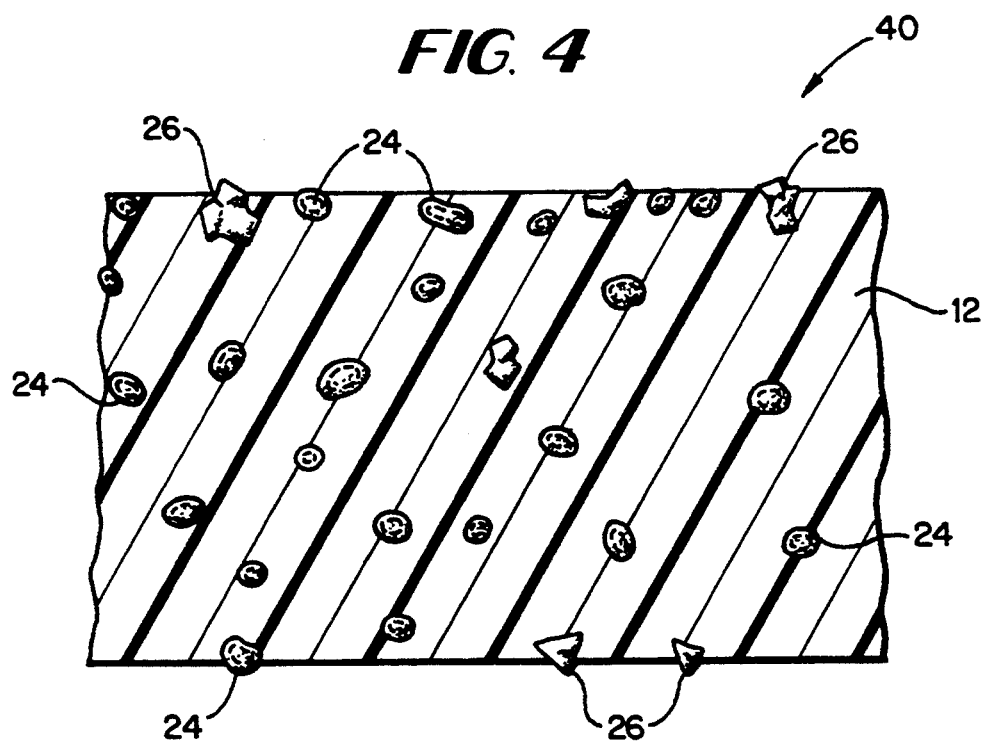
FIG. 4 is a vertical cross-sectional view similar to FIG. 2, containing the tile base with a mixture of round coated mineral chips and partially cross linked chips dispersed therein.

The embodiment of FIG. 4 shows a tile product 40 which includes a tile base 12 with a mixture of round coated mineral chips 24 and partially cross linked chips 26 uniformly dispersed throughout the base 12 and with additional chips 24, 26 having been spread on the surface of the tile base 12 and pressed in.

In another embodiment of the present invention, the coated mineral chips are added at a two roll mixing mill after the hot base from the intensive mixer has been formed into a pad covering the mill front roll. The pad from the mill containing the coated chips is removed from the roll by a knife. The pad is formed into a continuous sheet of the desired thickness by a series of calenders, then cut into tiles by a punch press.

Rework materials generated by reject tiles and press webbing are ground into chips about ¼ inch in size. The rework chips are heated to about 240 degrees F. and fed either back to the mill or spread on top of the sheet between the calenders where the sheet temperature is about 300 degrees F.

By using this method, none of the abrasive ceramic chips enter the intensive mixer, thus avoiding rapid mixer wear.

After the first calender, between 2 and 10 weight percent, based on the total formulation, of coated mineral or partially cross linked chips or a combination of both can be added to the surface of the sheet to compensate for the skinning effect, primarily caused by the mill. These chips are pressed into the sheet by either a pressure roll or a calender.

FIGS. 5 and 6 show the granite appearance or effect obtained with the present invention and the different result obtained depending on whether the amount of chip materials employed is relatively sparse (FIG. 5) or relatively heavy (FIG. 6).

In the selection of the additional chips which are spread on the top surface of the tile base, the features to be considered include those of the coated mineral chips, having the advantages of not breaking down during mixing and being relatively inexpensive, and the partially cross linked resinous chips, having the advantages of providing some degree of flow and with improved surface effect such as smoothness.

The main reason for spreading additional chips on the top surface is to overcome the "skinning effect" caused primarily by the mill and also by the calender. As the mill pad is processed, the surface chips tend to skin over with base formulation and as a result such surface chips become less visible. To compensate for this effect, additional chips are spread on the top surface and pressed in by roller or calender roll. The tiles can also be sanded to remove the skin.

In one embodiment in which heavy surface coverage with chips was desired, such as shown in FIG. 6, the chips employed for surface coverage had a mesh size range of −35 to +100. Preferably 96 to 100 weight percent of the surface chips were in this range, with 0 to 2% allowed as larger size chips and 0 to 2% allowed as smaller size chips.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method for making a tile composition formed with resinous chips which are partially cross-linked to allow such chips to remain discrete during processing, which method comprises:
   (a) providing a tile base in the form of a filled, thermoplastic material, said tile base containing (i) about 10 to 25 weight percent of a thermoplastic polymer in the form of polyvinyl chloride homopolymer or a vinyl chloride copolymer in which the vinyl chloride portion is predominant, (ii) about 50 to 85 weight percent of a filler material and (iii) a lubricant component; and
   (b) adding particulate materials in the form of filled thermoplastic chips to said tile base, said chips containing (i) about 25 to 80 weight percent of a thermoplastic polymer in the form of polyvinyl chloride homopolymer or a vinyl chloride copolymer in which the vinyl chloride portion is predominant, (ii) about 10 to 75 weight percent of filler material and (iii) a plasticizer selected from the group consisting of phenolic resin, polyester or epoxy resin, each of said chips being cross-linked in an amount of from about 18 weight percent of the polymeric phase to an amount not greater than an amount which prevents flowing at elevated temperatures.

2. The method of claim 1 wherein said tile base includes a lubricant in the form of an internal lubricant or a filler coated with lubricant.

3. The method of claim 1 wherein said chips are partially soluble in tetrahydrofuran.

4. The method of claim 1 wherein said chips include about 5 to 50 weight percent of a high-melting thermoplastic material.

5. The method of claim 1 wherein said chips are crosslinked in an amount of about 9 to 30 weight percent of the total chip formulation.

6. The method of claim 1 wherein said chips are produced by mixing the chip ingredients in an intensive mixer, with mixing until a temperature of about 350 degrees F. is obtained so that the ingredients become a molten mass, followed by calendering the mass to produce a sheet of material, after which the sheet is heated to about 400 degrees F. to cross link the polymeric ingredients and then allowed to cool followed by grinding the material into chips wherein the major portion is of U.S. mesh size 14 to 40.

7. The method of claim 1 wherein the ingredients for producing the tile base are first added to an intensive mixer with mixing until the ingredients become a molten thermoplastic mass, followed by addition of said chips, with the molten mass including said chips being dropped to a two roll mill where a sheet is formed, then calendered to gauge and cut into individual tiles.

8. The method of claim 7 wherein the time interval from addition of chips to dropping of the molten mass to the two roll mill is about 20 seconds to 3 minutes.

9. A tile composition formed with ceramic coated mineral chips so as to produce a granite appearance, comprising a thermoplastic tile base having uniformly dispersed therein particulate materials in the form of a ceramic coated mineral chips which remain as discrete particles within the tile base, said mineral chips being each individually coated and encapsulated with a pigmented ceramic coating and wherein said ceramic coated mineral chips having a Mohs hardness of 5 to 8 and a particle size of 44 to 2,000 microns.

10. The tile composition of claim 9 wherein a clear mineral and a colored ceramic coating are employed in the chips with the result that the colored coating will show through the back as well as the surface of the chips and the color will not change as the chips wear.

11. The tile composition of claim 9 wherein the mineral for the chips is selected from the group consisting of quartz, glass, apatite, feldspar and anorthite.

12. The tile composition of claim 9 wherein about 1 to 10 weight percent of the total composition of additional particulate materials are pressed into the top surface of said tile base.

13. The tile composition of claim 12 wherein a clear mineral and a colored ceramic coating are employed for said additional particulate materials.

14. The tile composition of claim 12 wherein said additional particulate materials are partially cross linked resinous chips.

15. The tile composition of claim 9 wherein said tile base contains (a) about 10 to 25 weight percent of a thermoplastic polymer in the form of polyvinyl chloride homopolymer or a vinyl chloride copolymer in which the vinyl chloride portion is predominant.

16. The tile composition of claim 15 wherein said tile base further contains (a) about 50 to 85 weight percent of filler material and (b) a lubricant component.

17. The tile composition of claim 9 wherein said chips are coated with a ceramic coating having a thickness of 0.5 to 1.5 mils.

18. The tile composition of claim 9 wherein said particulate materials are in the form of a mixture of ceramic coated mineral chips and partially cross linked resinous chips.

19. The tile composition of claim 9 wherein said particulate materials are present in an amount of about 2 to 20 weight percent of the total composition.

20. The tile composition of claim 9 wherein said partially cross linked chips are of a filled thermoplastic material.

21. The tile composition of claim 12 wherein said partially cross linked chips contain (a) about 25 to 80 weight percent of a thermoplastic polymer in the form of polyvinyl chloride homopolymer or a vinyl chloride copolymer in which the vinyl chloride portion is predominant, (b) about 10 to 75 weight percent of filler material and (c) a plasticizer selected from the group consisting of phenolic resin, polyester or epoxy resin, each of said partially cross linked chips being cross linked in an amount of from about 18 weight percent of the polymeric phase to an amount not greater than an amount which prevents flowing at elevated temperatures.

22. A tile composition formed with coated mineral chips so as to produce a granite appearance, comprising a thermoplastic tile base having uniformly dispersed therein particulate materials in the form of mineral chips coated with a polyester or epoxy coating, said mineral chips being each individually coated and encapsulated with a pigmented polyester or epoxy coating and remaining as discrete particles within the tile base, and wherein said coated mineral chips have a Mohs hardness of 5 to 8 and a particle size of 44 to 2,000 microns.

23. The tile composition of claim 22 wherein a clear mineral and a colored coating are employed in the chips with the result that the colored coating will show through the back as well as the surface of the chips and the color will not change as the chips wear.

24. The tile composition of claim 22 wherein the mineral for the chips is selected from the group consisting of quartz, apatite, feldspar, anorthite and glass.

25. The tile composition of claim 22 wherein about 1 to 10 weight percent of the total composition of additional particulate materials are pressed into the top surface of said tile base.

26. The tile composition of claim 25 wherein said additional particulate materials are coated mineral chips having a Mohs hardness of 5 to 8.

27. The tile composition of claim 25 wherein a clear mineral and a colored coating are employed for said additional particulate materials.

28. The tile composition of claim 25 wherein said additional particulate materials are partially cross linked resinous chips.

29. The tile composition of claim 22 wherein said tile base contains (a) about 10 to 25 weight percent of a thermoplastic polymer in the form of polyvinyl chloride homopolymer or a vinyl chloride copolymer in which the vinyl chloride portion is predominant.

30. The tile composition of claim 29 wherein said tile base further contains (a) about 50 to 85 weight percent of filler material and (b) a lubricant component.

31. The tile composition of claim 25 wherein said additional particulate materials are in the form of a mixture of coated mineral chips having a Mohs hardness of 5 to 8 and partially cross linked resinous chips.

32. The tile composition of claim 22 wherein said chips are coated with a polyester or epoxy coating having a thickness of 0.5 to 5 mils.

33. The tile composition of claim 22 wherein said particulate materials are in the form of a mixture of coated mineral chips and partially cross linked resinous chips.

34. The tile composition of claim 22 wherein said particulate materials are present in an amount of about 2 to 20 weight percent of the total composition.

35. The tile composition of claim 33 wherein said particulate materials are present in an amount of about 2 to 20 weight percent of the total composition.

36. The tile composition of claim 22 wherein said coated mineral chips are of a round shape.

37. The tile composition of claim 22 wherein said coated mineral chips are of an angular shape.

38. The tile composition of claim 28 wherein said partially cross linked chips are of a filled thermoplastic material.

39. The tile composition of claim 33 wherein said partially cross linked chips are of a filled thermoplastic material.

40. The tile composition of claim 33 wherein said partially cross linked chips contain (a) about 25 to 80 weight percent of a thermoplastic polymer in the form of Dolyvinyl chloride homopolymer or a vinyl chloride copolymer in which the vinyl chloride portion is predominant, (b) about 10 to 75 weight percent of filler material and (c) a plasticizer selected from the group consisting of phenolic resin, polyester or epoxy resin, each of said partially cross linked chips being cross linked in an amount of from about 18 weight percent of the polymeric phase to an amount not greater than an amount which prevents flowing at elevated temperatures.

41. A method for making an inlaid plastic tile having a granite appearance which comprises:
   (a) providing a tile base formulation in the form of a filled thermoplastic material;
   (b) blending particulate materials in the form of coated mineral chips with the tile base formulation in a mixer such as a Banbury mixer to provide a mixture in which the particulate materials are uniformly dispersed and remain as discrete particles throughout the tile base formulation, said mineral chips being each individually coated and encapsulated with a pigmented coating selected from the group consisting of polyester, epoxy and ceramic coating to provide coated mineral chips having a Mohs hardness of 5 to 8;
   (c) forming the mixture into a sheet; and
   (d) calendering the sheet to a final thickness.

42. The method of claim 41 wherein said particulate materials are in the form of a mixture of coated mineral chips and cross linked resinous chips wherein said resinous chips are cross linked in an amount of from about 18 weight percent of the polymeric phase to an amount not greater than an amount which prevents flowing at elevated temperatures.

43. The method of claim 41 wherein a clear or translucent mineral and a pigmented or colored coating are employed in the chips with the result that the colored coating will show through the back as well as the surface of the chips and the color will not change as the chips wear.

44. The method of claim 41 wherein the mineral for the chips is selected from the group consisting of quartz, apatite, feldspar, anorthite, flint and glass.

45. The method of claim 41 wherein about 1 to 10 weight percent of the total composition of additional particulate materials are pressed into the top surface of said tile base.

46. The method of claim 45 wherein said additional particulate materials are coated mineral chips having a Mohs hardness of 5 to 8.

47. The method of claim 46 wherein a clear or translucent mineral and a pigmented or colored coating are employed for said additional particulate materials.

48. The method of claim 45 wherein said additional particulate materials are cross linked resinous chips wherein said resinous chips are cross linked in an amount of from about 18 weight percent of the polymeric phase to an amount not greater than an amount which prevents flowing at elevated temperatures.

49. The method of claim 45 wherein said additional particulate materials include a mixture of coated mineral chips having a Mohs hardness of 5 to 8 and cross linked resinous chips wherein said resinous chips are cross linked in an amount of from about 18 weight percent of the polymeric phase to an amount not greater than an amount which prevents flowing at elevated temperatures.

* * * * *

UNITED STATES PATENT AND TRADEMARK OFFICE
CERTIFICATE OF CORRECTION

PATENT NO. : 5,358,993
DATED : October 25, 1994
INVENTOR(S) : Timm et al.

It is certified that error appears in the above-identified patent and that said Letters Patent is hereby corrected as shown below:

Column 1, line 34, cancel "of", insert --or--.

Column 4, line 2, cancel "chid", insert --chip--.

Column 4, line 40, cancel "title", insert --tile--.

Column 4, line 40, cancel "ingredients", insert --ingredient--.

Column 4, line 54, cancel "materials-".

Column 7, line 15, cancel "coatinq", insert --coating--.

Column 8, line 68, cancel "nch", insert --inch--.

Column 9, line 1, after "1/8", insert --"--.

Column 12, line 1, cancel "9", insert --14--.

Column 13, line 20, cancel "Dolyvinyl", insert --polyvinyl--.

Signed and Sealed this

Seventeenth Day of January, 1995

Attest:

BRUCE LEHMAN

*Attesting Officer*   *Commissioner of Patents and Trademarks*